(12) United States Patent
Watanabe et al.

(10) Patent No.: US 11,879,560 B2
(45) Date of Patent: Jan. 23, 2024

(54) FLOW-PATH FORMING BLOCK AND FLUID CONTROL DEVICE PROVIDED WITH FLOW-PATH FORMING BLOCK

(71) Applicant: FUJIKIN INCORPORATED, Osaka (JP)

(72) Inventors: Kazunari Watanabe, Osaka (JP); Kenji Aikawa, Osaka (JP); Kohei Shigyou, Osaka (JP); Tomohiro Nakata, Osaka (JP); Takahiro Matsuda, Osaka (JP); Tsutomu Shinohara, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 180 days.

(21) Appl. No.: 17/604,478

(22) PCT Filed: Feb. 18, 2020

(86) PCT No.: PCT/JP2020/006247
§ 371 (c)(1),
(2) Date: Oct. 18, 2021

(87) PCT Pub. No.: WO2020/217665
PCT Pub. Date: Oct. 29, 2020

(65) Prior Publication Data
US 2022/0213972 A1    Jul. 7, 2022

(30) Foreign Application Priority Data
Apr. 26, 2019 (JP) .................................. 2019-086395

(51) Int. Cl.
*F16K 27/00*        (2006.01)
*F16K 1/46*         (2006.01)
(Continued)

(52) U.S. Cl.
CPC ............. *F16K 27/003* (2013.01); *F16K 1/46* (2013.01); *F16K 27/02* (2013.01); *F16L 41/02* (2013.01)

(58) Field of Classification Search
CPC ......... F16K 1/46; F16K 27/003; F16J 15/064; Y10T 137/87885
See application file for complete search history.

(56) References Cited

U.S. PATENT DOCUMENTS

| 5,083,742 A | 1/1992 | Wylie et al. |
| 5,316,034 A * | 5/1994 | Farnsworth .......... B01J 19/0046 137/212 |

(Continued)

FOREIGN PATENT DOCUMENTS

| EP | 2792916 A1 | 10/2014 |
| JP | S5797268 U | 6/1982 |

(Continued)

OTHER PUBLICATIONS

WIPO, International Search Report dated Apr. 3, 2020.

*Primary Examiner* — Reinaldo Sanchez-Medina
(74) *Attorney, Agent, or Firm* — Li & Cai Intellectual Property (USA) Office (57) ABSTRACT

A flow-path forming block includes: a first block; a second block attached to the first block, the second block having a first flow path and a second flow path; and a gasket provided between the first block and the second block, the gasket being configured to seal between the first block and the second block, wherein the second block has a communication portion formed on a surface facing the gasket, the communication portion being configured such that the first flow path and the second flow path are communicated, and the gasket has a recessed portion formed at a position facing the communication portion.

4 Claims, 6 Drawing Sheets

(51) Int. Cl.
*F16K 27/02* (2006.01)
*F16L 41/02* (2006.01)

(56) References Cited

U.S. PATENT DOCUMENTS

| | | | | |
|---|---|---|---|---|
| 8,496,029 | B2 * | 7/2013 | Vu | F16L 41/03 |
| | | | | 137/271 |
| 2003/0102040 | A1 * | 6/2003 | Fukano | F15B 13/0821 |
| | | | | 137/884 |
| 2006/0060253 | A1 | 3/2006 | Yoshida et al. | |
| 2007/0262581 | A1 * | 11/2007 | Ishihara | F16L 23/22 |
| | | | | 285/10 |

FOREIGN PATENT DOCUMENTS

| | | | |
|---|---|---|---|
| JP | H0666777 | A | 3/1994 |
| JP | 200569305 | A | 3/2005 |
| JP | 2014152874 | A | 8/2014 |
| JP | 2015178893 | A | 10/2015 |
| WO | WO 2004/036099 | A1 | 4/2004 |

\* cited by examiner

FLOW-PATH FORMING BLOCK AND FLUID CONTROL DEVICE PROVIDED WITH FLOW-PATH FORMING BLOCK

TECHNICAL FIELD

The present invention relates to a flow-path forming block and to a fluid control device provided with the flow-path forming block.

BACKGROUND ART

JP2014-152874A discloses a process-gas diverted-flow supply device that is configured such that fluid control apparatuses are communicated with each other through a V-shaped flow path formed in a lower body.

SUMMARY OF INVENTION

In a fluid control device (the process-gas diverted-flow supply device) such as that disclosed in JP2014-152874A, if a distance between two flow paths of the V-shaped flow path is reduced in order to reduce a size of a fluid control device and/or a flow-path forming block (the lower body), an angle formed by these two flow paths is made smaller. As the angle between the flow paths is made smaller as described above, the effective cross section of a portion where the flow path is turned is reduced, causing the pressure loss to increase, which in turn results in a higher resistance to a flow of fluid.

The present invention is made in view of such a technique problem, and an object thereof is to provide a flow-path forming block that is capable of ensuring the effective cross section of flow paths even if a size of a flow-path forming block and/or a fluid control device is reduced.

A flow-path forming block according to an aspect of the present invention is provided with: a first block; a second block attached to the first block, the second block having a first flow path and a second flow path; and a gasket provided between the first block and the second block, the gasket being configured to seal between the first block and the second block, wherein the second block has a communication portion formed on a surface facing the gasket, the communication portion being configured such that the first flow path and the second flow path are communicated, and the gasket has a recessed portion formed at a position facing the communication portion.

According to this aspect, it is possible to allow the first flow path and the second flow path to be communicated with each other through the recessed portion in addition to the communication portion. With such a configuration, even if the angle formed between the first flow path and the second flow path becomes smaller, it is possible to ensure the effective cross section of the flow path at a portion where the first flow path and the second flow path are connected. With such a configuration, it is possible to reduce the size of the flow-path forming block and/or the fluid control device.

DESCRIPTION OF EMBODIMENTS

An embodiment of the present invention will be described below with reference to the attached drawings.

A fluid control device 100 in this embodiment is used for means for supplying a process gas and a purge gas in a semiconductor manufacturing equipment (a CVD equipment, a sputtering equipment, an etching equipment, and so forth).

Figure 1:
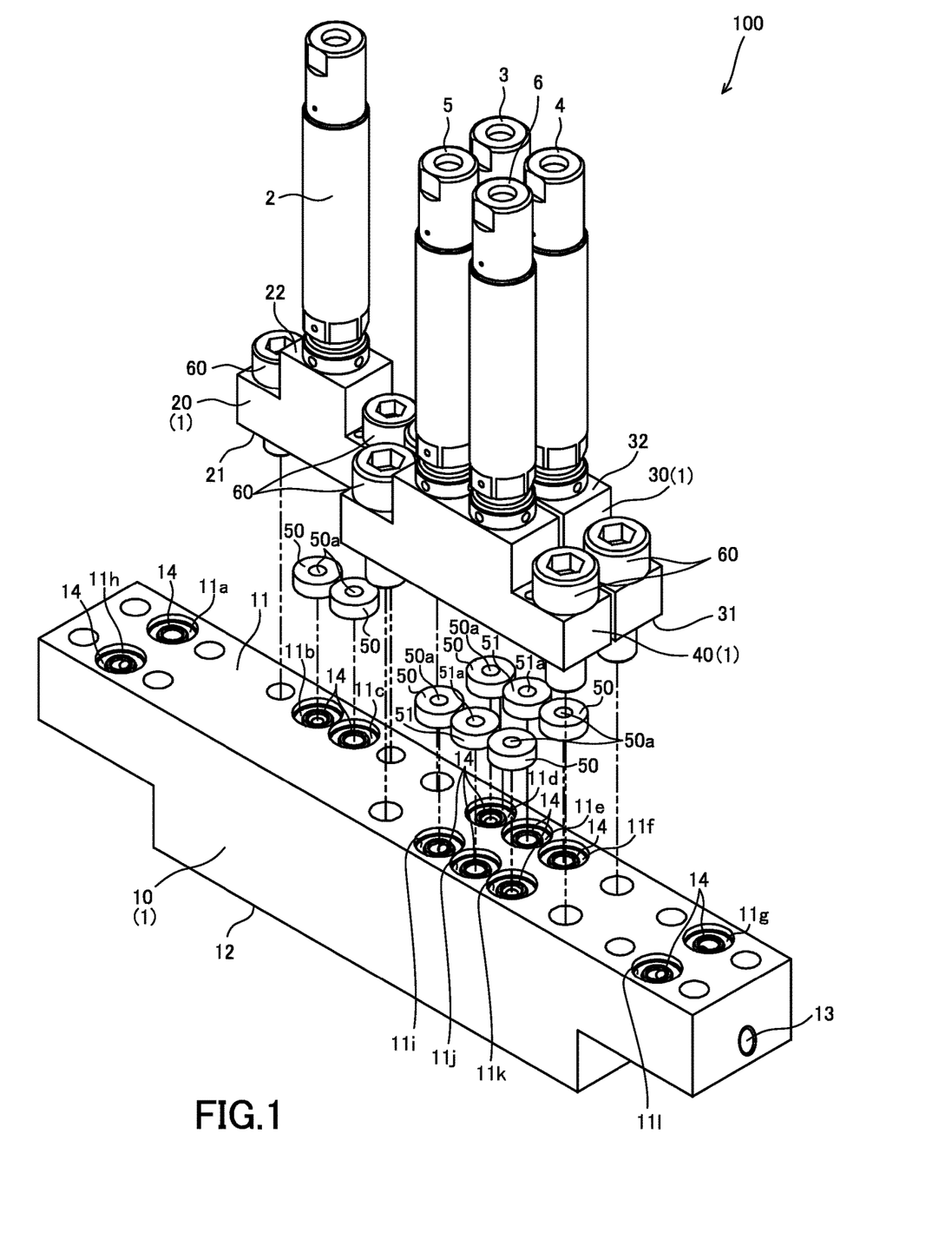
FIG. 1 is an exploded perspective view of a fluid control device according to an embodiment of the present invention.
Figure 3:
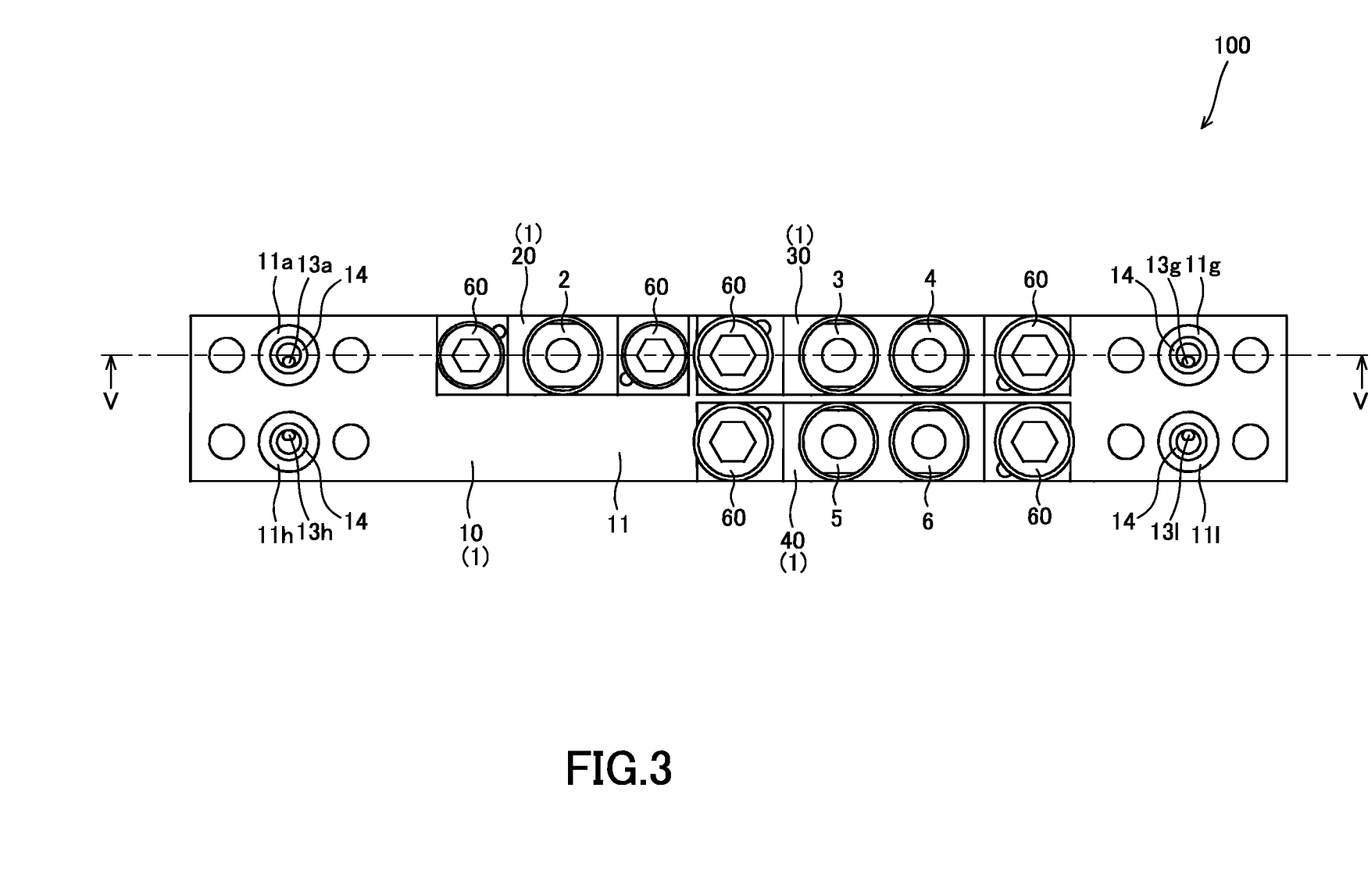
FIG. 3 is a top view of the fluid control device according to the embodiment of the present invention.
Figure 4:
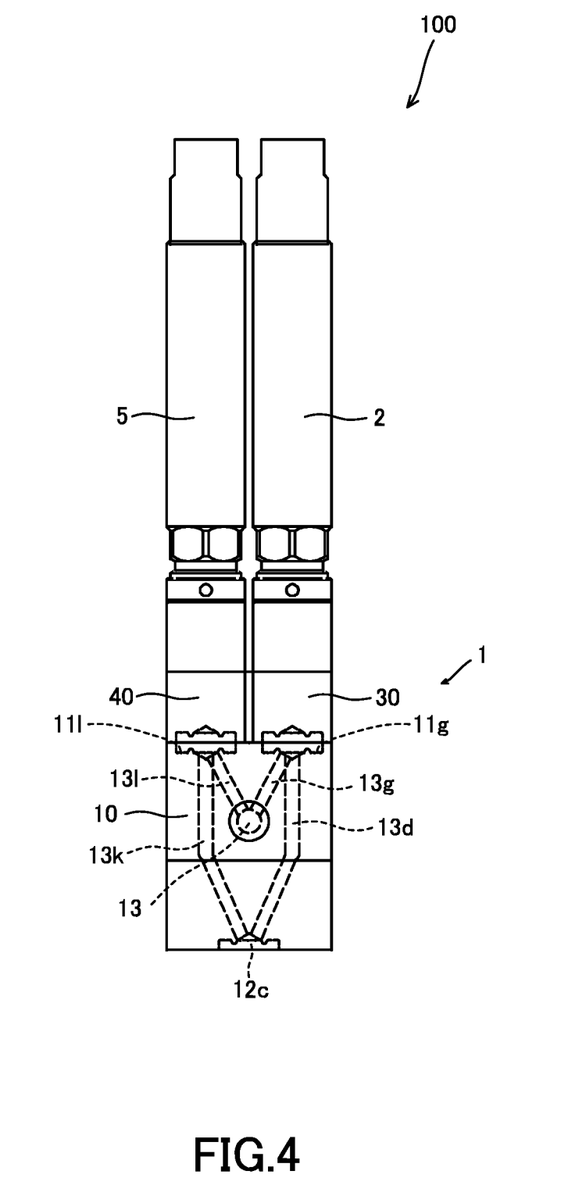
FIG. 4 is a side view of the fluid control device according to the embodiment of the present invention.

As shown in FIGS. 1, 3, and 4, the fluid control device 100 is provided with a flow-path forming block 1 and a plurality of valve devices 2, 3, 4, 5, and 6 attached to the flow-path forming block 1. The valve devices 2, 3, 4, 5, and 6 are air-operated valves that are operated by supplying operating pressure. Note that the valve devices 2, 3, 4, 5, and 6 may be of a normally closed type or of a normally open type. In addition, the valve devices 2, 3, 4, 5, and 6 each has a metallic diaphragm serving as a valve body.

The flow-path forming block 1 is provided with a block 10 serving as a first block, a block 20 that is attached to the block 10, a block 30 serving as a second block that is attached to the block 10, a block 40 serving as the second block that is attached to the block 10, and a plurality of gaskets 50 and 51 that are provided between the block 10 and the blocks 20, 30, and 40 so as to seal between the block 10 and the blocks 20, 30, and 40. The blocks 20, 30, and 40 are attached to the block 10 with bolts 60. In the above configuration, because the block 30 and the block 40 have the same configuration, only the block 30 will be specifically described below, and the description of the block 40 will be omitted.

The block 10 is made of stainless steel (for example, SUS316L). The block 10 is provided with a first attachment surface 11 to which the blocks 20, 30, and 40 are attached, a second attachment surface 12 located on the opposite side from the first attachment surface 11, a flow path 13 (see FIG. 2) that is formed in the block 10 so as to penetrate through in the longitudinal direction of the block 10, accommodating concave portions 11a to 11l that are formed in the first attachment surface 11 and that respectively accommodate the gaskets 50 and 51, and accommodating concave portions 12a to 12c (see FIG. 2) that are formed in the second attachment surface 12 and that respectively accommodate gaskets (not shown).

The accommodating concave portions 11a to 11l are formed so as to be cylindrically recessed from the first attachment surface 11. Annular protrusions 14, which are each formed to have an annular shape, are respectively of provided on bottom surfaces of the accommodating concave portions 11a to 11l. The accommodating concave portions 11a to 11l are all formed to have the same shape. With such a configuration, it is possible to improve the working efficiency of processing of the accommodating concave portions 11a to 11l.

Figure 2:
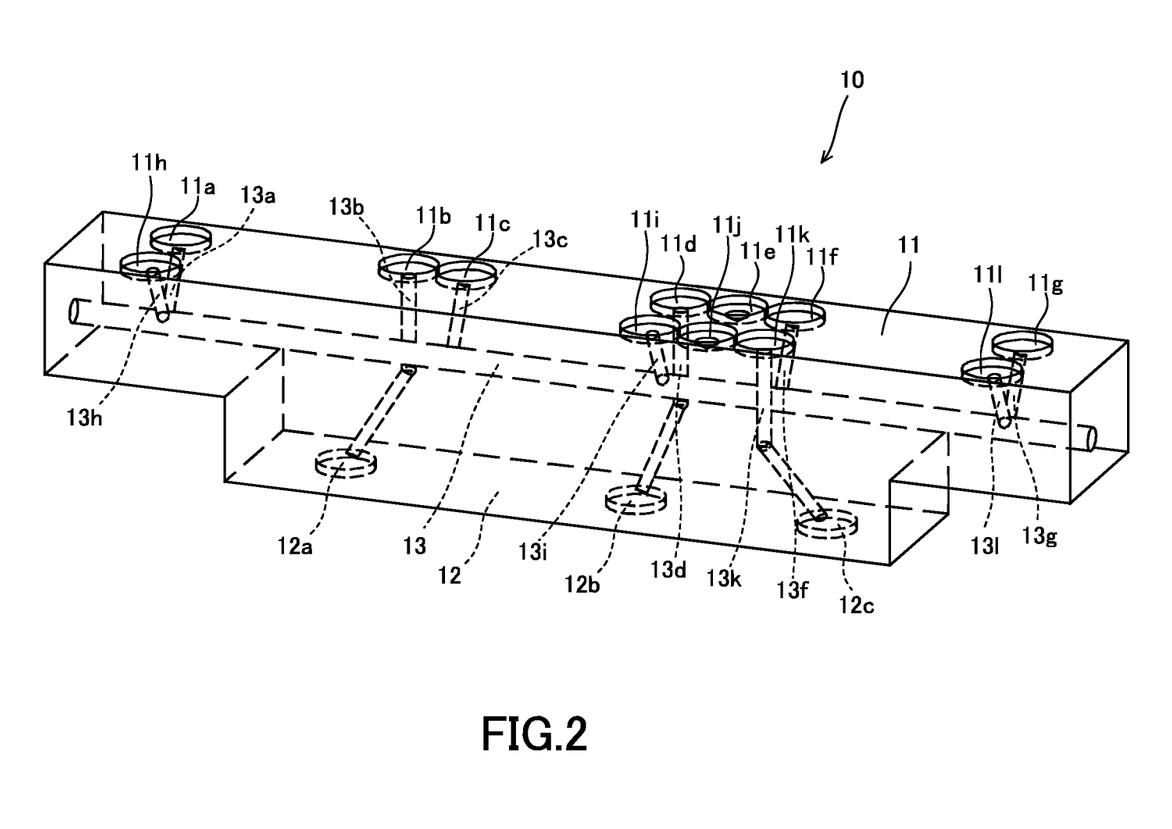
FIG. 2 is a perspective view of a first block according to the embodiment of the present invention.

As shown in FIG. 2, the block 10 is further provided with a flow path 13a that opens in an inner circumferential side of the annular protrusion 14 of the accommodating concave portion 11a so as to communicate with the flow path 13, a flow path 13b that opens in an inner circumferential side of the annular protrusion 14 of the accommodating concave portion 11b so as to communicate with the accommodating concave portion 12a, a flow path 13c that opens in an inner circumferential side of the annular protrusion 14 of the accommodating concave portion 11c so as to communicate with the flow path 13, a flow path 13d that opens in an inner circumferential side of the annular protrusion 14 of the accommodating concave portion 11d so as to communicate with the accommodating concave portion 12b, a flow path 13f that opens in an inner circumferential side of the annular protrusion 14 of the accommodating concave portion 11f so as to communicate with the flow path 13, a flow path 13g that opens in an inner circumferential side of the annular protrusion 14 of the accommodating concave portion 11g so as to communicate with the flow path 13, a flow path 13h that opens in an inner circumferential side of the annular protrusion 14 of the accommodating concave portion 11h so as to communicate with the flow path 13, a flow path 13i that opens in an inner circumferential side of the annular protrusion 14 of the accommodating concave portion 11i so as to communicate with the flow path 13, a flow path 13k that opens in an inner circumferential side of the annular protrusion 14 of the accommodating concave portion 11k so as to communicate with the accommodating concave portion 12c, and a flow path 13l that opens in an inner circumferential side of the annular protrusion 14 of the accommodating concave portion 11l so as to communicate with the flow path 13. In the above, the flow paths 13a, 13g, 13h, and 13l are in communication with a fluid apparatus (not shown), etc. that is to be attached to the first attachment surface 11. In addition, the flow paths 13b, 13d, and 13k are in communication with other flow-path forming block (not shown), etc. that is to be attached to the second attachment surface 12.

Figure 5:
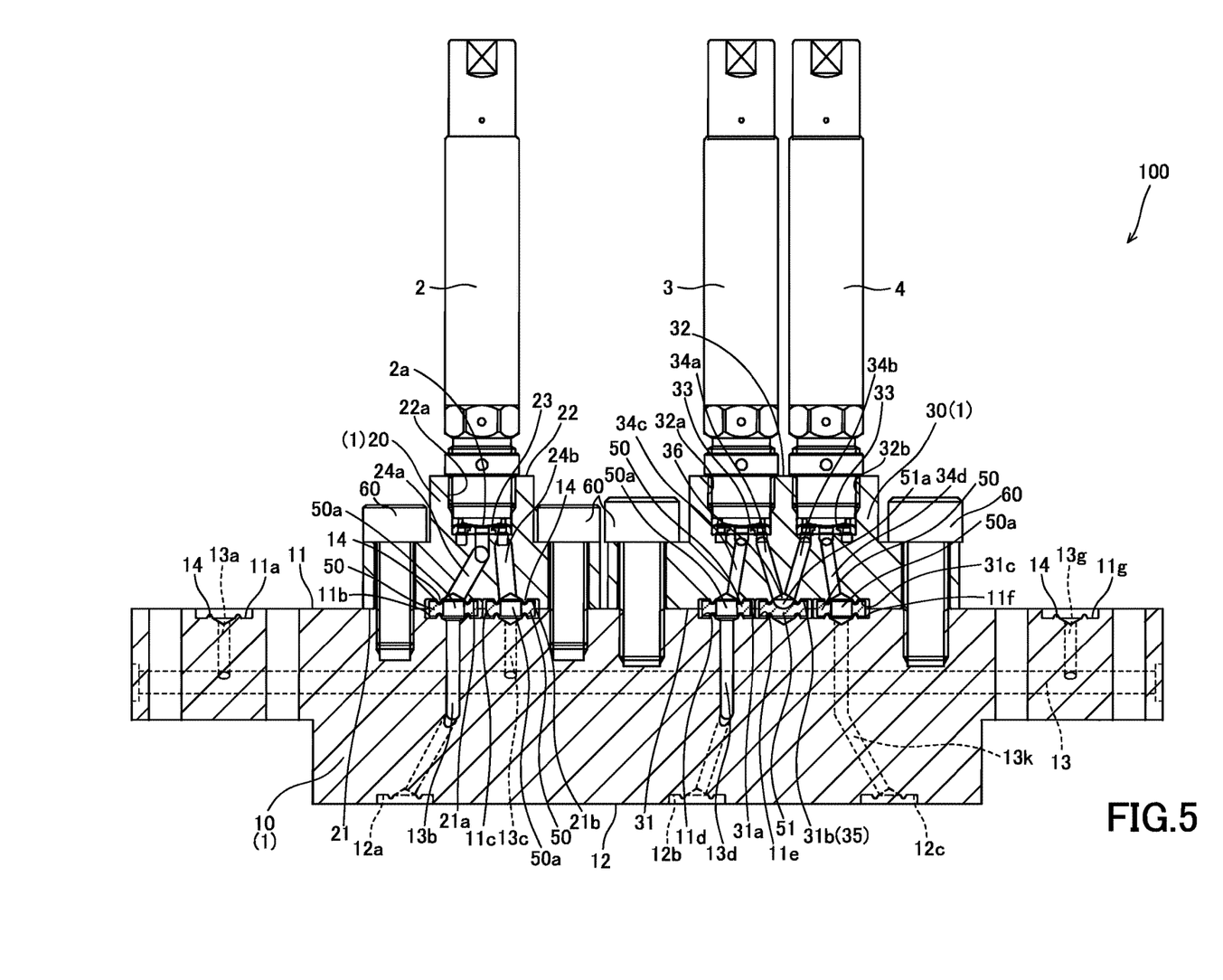
FIG. 5 is a sectional view taken along a line V-V in FIG. 3.

The block 20 is made of the stainless steel (for example, SUS316L). As shown in FIG. 5, the block 20 is provided with a third attachment surface 21 that is attached to the block 10, a fourth attachment surface 22 located on the opposite side from the third attachment surface 21 and to which the valve device 2 is attached, accommodating concave portions 21a and 21b that are formed in the third attachment surface 21 and that respectively accommodate the gaskets 50, and a valve-accommodating portion 22a that is formed in the fourth attachment surface 22 and that partially accommodates the valve device 2.

The accommodating concave portions 21a and 21b are formed so as to be cylindrically recessed from the third attachment surface 21. The annular protrusions 14 are respectively provided on bottom surfaces of the accommodating concave portions 21a and 21b. In the above, the accommodating concave portions 21a and 21b are formed to have the same shape as the accommodating concave portions 11a to 11l. With such a configuration, it is possible to improve the working efficiency of the processing of the accommodating concave portions 21a and 21b.

On a bottom surface of the valve-accommodating portion 22a, an annular valve sheet 23, on/from which a diaphragm 2a serving as the valve body of the valve device 2 is seated/separated, is provided. The valve-accommodating portion 22a is formed with an internal thread that is threaded to an external thread that is formed on an outer circumference portion of the valve device 2. The valve device 2 is fixed to the block 20 by threading the external thread formed on the outer circumference portion of the valve device 2 to the internal thread formed in the valve-accommodating portion 22a.

The block 20 is further provided with a flow path 24a that opens in an inner circumferential side of the valve sheet 23 in the valve-accommodating portion 22a and that is in communication with the accommodating concave portion 21a and a flow path 24b that opens at an outer circumferential side of the valve sheet 23 in the valve-accommodating portion 22b and that is in communication with the accommodating concave portion 21b. The flow path 24a communicates with the flow path 13b through a through hole 50a formed in the gasket 50. The flow path 24b communicates with the flow path 13c through the through hole 50a formed in the gasket 50.

The block 30 is made of the stainless steel (for example, SUS316L). As shown in FIG. 5, the block 30 is provided with a fifth attachment surface 31 attached to the block 10, a sixth attachment surface 32 located on the opposite side from the fifth attachment surface 31 and to which the valve devices 3 and 4 are attached, accommodating concave portions 31a to 31c that are formed in the fifth attachment surface 31 and that respectively accommodate the gaskets 50 and 51, and valve-accommodating portions 32a and 32b that are formed in the sixth attachment surface 32 and that respectively accommodate the valve devices 3 and 4 partially.

The accommodating concave portions 31a to 31c are formed so as to be cylindrically recessed from the fifth attachment surface 31. The annular protrusions 14 are respectively provided on bottom surfaces of the accommodating concave portions 31a to 31c. In the above, the accommodating concave portions 31a to 31c are formed to have the same configuration as the accommodating concave portions 11a to 11l. With such a configuration, it is possible to improve the working efficiency of the processing of the accommodating concave portions 31a to 31c.

Figure 6:
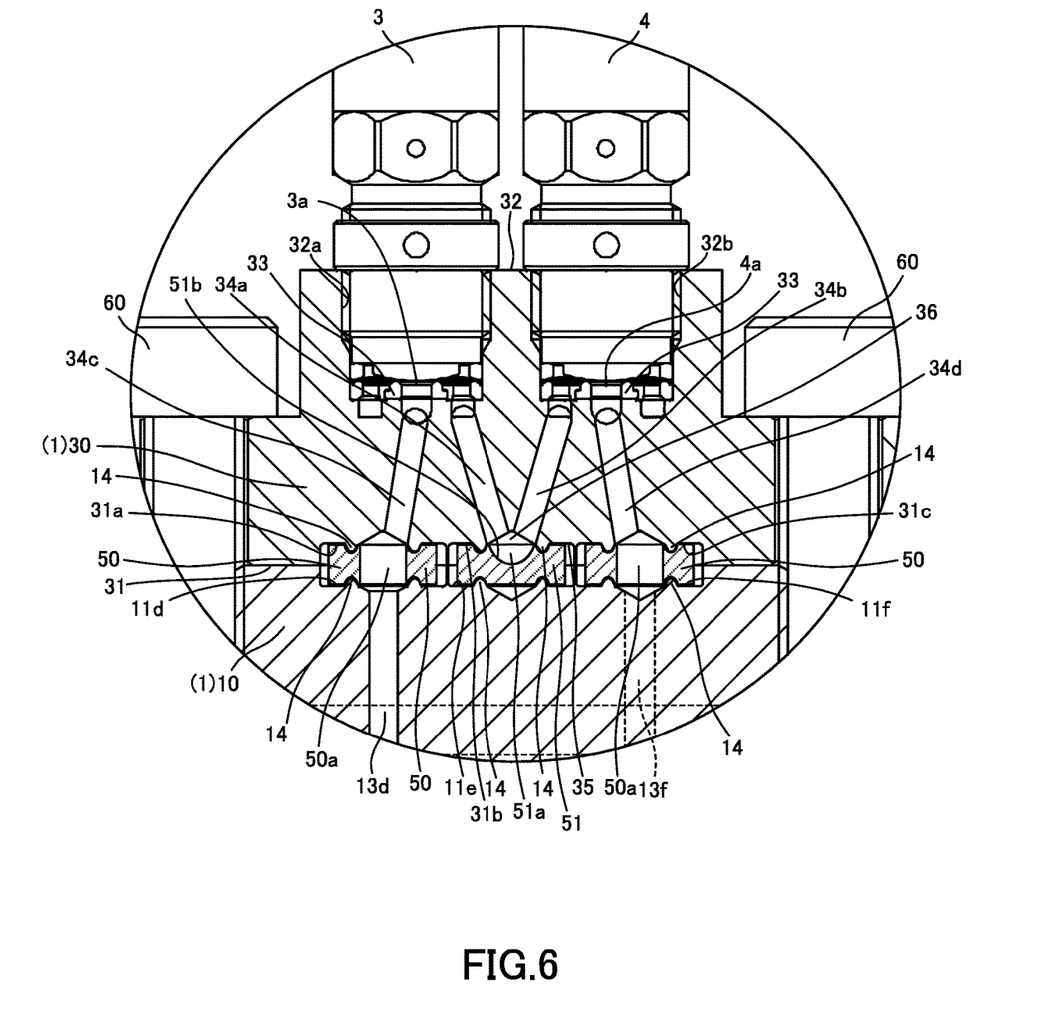
FIG. 6 is a partial sectional view of main relevant parts of a flow-path forming block according to the embodiment of the present invention.

As shown in FIGS. 5 and 6, annular valve sheets 33, on/from which diaphragms 3a and 4a serving as the valve bodies of the valve devices 3 and 4 are respectively seated/separated, are respectively provided on bottom surfaces of the valve-accommodating portions 32a and 32b. The valve-accommodating portions 32a and 32b are each formed with an internal thread that is threaded to an external thread that is formed on each of outer circumference portions of the valve devices 3 and 4. The valve devices 3 and 4 are each fixed to the block 30 by threading the external thread formed on the outer circumference portion thereof to each of the internal threads formed in the valve-accommodating portions 32a and 32b.

The block 30 is further provided with a flow path 34a that opens at an outer circumferential side of the valve sheet 33 in the valve-accommodating portion 32a so as to communicate with the accommodating concave portion 31b, a flow path 34b that opens at the outer circumferential side of the valve sheet 33 in the valve-accommodating portion 32b so as to communicate with the accommodating concave portion 21b, a flow path 34c that opens at an inner circumferential side of the valve sheet 33 in the valve-accommodating portion 32a so as to communicate with the accommodating concave portion 31a, a flow path 34d that opens at the inner circumferential side of the valve sheet 33 in the valve-accommodating portion 32b so as to communicate with the accommodating concave portion 31c, and a communication portion 36 through which the flow path 34a is communicated with the flow path 34b.

The flow path 34a and the flow path 34b are provided so as to approach with each other towards the communication portion 36, in other words, so as to form a substantially V-shape.

The flow path 34c communicates with the flow path 13d through the through hole 50a formed in the gasket 50. The flow path 34d communicates with the flow path 13f through the through hole 50a formed in the gasket 50.

As shown in FIG. 6, the communication portion 36 is formed on a bottom surface 35 facing the gasket 51 of the accommodating concave portion 31b. Specifically, the communication portion 36 is formed so as to open at an inner circumferential side of the annular protrusion 14 in the accommodating concave portion 31b. For example, the communication portion 36 is formed to have a conical shape. The shape of the communication portion 36 is not limited thereto, and the communication portion 36 may have a hemispherical shape, for example.

Next, the gasket 50 and the gasket 51 will be described. The gaskets 50 and 51 are disc-shaped metal gaskets and are made of stainless steel (for example, SUS316L), for example. The gasket 50 and the gasket 51 are formed to have the same diameter and the same thickness. The gaskets 50 and 51 are respectively provided in spaces that are respectively formed by the accommodating concave portions 11b to 11f and 11i to 11k and the accommodating concave portions 21a, 21b, and 31a to 31c. As the annular protrusions 14 formed in the accommodating concave portions 11b to 11f and 11i to 11k and the annular protrusions 14 formed in the accommodating concave portions 21a, 21b, and 31a to 31c bite into the gaskets 50 and 51, the gaskets 50 and 51 are respectively clamped between the block 10 and the blocks 20, 30, and 40 and a leakage of the gas from between the block 10 and the blocks 20, 30, and 40 is prevented.

The gasket 50 is formed with the center through hole 50a that penetrates through between both surfaces thereof. The gasket 50 seals between the block 10 and the blocks 20, 30, and 40 and ensures the communication between the flow path formed in the block 10 and each of the flow paths formed in the blocks 20, 30, and 40 through the through hole 50a.

The gasket 51 is a gasket of a blind type having no through hole. The gasket 51 closes an opening of the communication portion 36 and has a recessed portion 51a that is formed at a position facing the communication portion 36. The recessed portion 51a is formed to have the hemispherical shape having a radius that is substantially the same as that of an opening portion of the communication portion 36. A curved surface portion 51b (see FIG. 6) forming the recessed portion 51a is formed such that the fluid flowing from the flow path 34a is guided so as to be turned to the flow path 34b.

Next, an operation of the fluid control device 100 will be described. The fluid control device 100 controls flows of the process gas and the purge gas. In the following, although an example of a method of using the fluid control device 100 is shown, the invention is not limited to this method.

First and second process gases are, for example, gases used when a thin film is to be formed on a wafer, and they are supplied into a chamber (not shown) via the fluid control device 100. The first process gas is supplied from the other flow-path forming block (not shown) that is attached at a position facing the accommodating concave portion 12b in the second attachment surface 12. The first process gas that has been supplied from the accommodating concave portion 12b is guided to the valve device 3 through the flow path 13d, the through hole 50a, and the flow path 34c (see FIGS. 5 and 6). As the diaphragm 3a of the valve device 3 is separated from the valve sheet 33, the first process gas is guided to the valve device 4 through the flow path 34a, the communication portion 36, the recessed portion 51a, and the flow path 34b. Furthermore, as the diaphragm 4a of the valve device 4 is separated from the valve sheet 33, the first process gas is guided to the flow path 13 through the flow path 34d, the through hole 50a, and the flow path 13f. The first process gas that has been guided to the flow path 13 is then guided to other fluid apparatus, etc. through the flow paths 13a, 13g, 13h, and 13l and is supplied to the chamber (not shown).

As described above, in the fluid control device 100, the valve device 3 and the valve device 4 are provided in series in the flow path formed by the flow paths 34a to 34d. Therefore, even in the event of failure of one of the valve device 3 and the valve device 4, it is possible to surely shut off the flow of the first process gas flowing through the flow paths 34a to 34d.

Similarly to the first process gas, the second process gas is supplied from other flow-path forming block (not shown) that is attached at a position facing the accommodating concave portion 12c of the second attachment surface 12 and is guided to the flow path 13 through the valve devices 5 and 6 and the flow path 13i (see FIGS. 1 and 2). Although detailed description is omitted because the block 30 and the block 40 have the same configuration, the valve device 5 and the valve device 6 are also provided in series with respect to the flow path. Thus, even in the event of failure of one of the valve device 5 and the valve device 6, it is possible to surely shut off the flow of the second process gas. In addition, the above-described advantage is also afforded with the gasket 51 provided between the block 40 and the block 10.

The purge gas is an inert gas (for example, nitrogen gas). For example, the purge gas is supplied into the fluid control device 100 in order to purge an interior of the fluid control device 100 when the supply of the first process gas is switched to the supply of the second process gas. The purge gas is supplied from other flow-path forming block (not shown) that is attached at the position facing the accommodating concave portion 12a of the second attachment surface 12. The purge gas that has been supplied from the accommodating concave portion 12a is guided to the valve device 2 through the flow path 13b, the through hole 50a, and the flow path 24a. As the diaphragm 2a of the valve device 2 is separated from the valve sheet 23, the purge gas is guided to the flow path 13 through the flow path 24b, the through hole 50a, and the flow path 13c. The interior of the flow path 13 is purged with the purge gas that has been guided to the flow path 13 as described above.

For example, if the distance between the valve device 3 and the valve device 4 is reduced in order to reduce the size of the fluid control device 100, the distance between the flow path 34a and the flow path 34b is reduced, and as a result, the angle formed between the flow path 34a and the flow path 34b becomes smaller. As described above, as the angle formed between the flow path 34a and the flow path 34b becomes smaller, a pressure loss (a flow path resistance) for the flow from the flow path 34a to the flow path 34b is increased. However, because the fluid control device 100 is provided with the recessed portion 51a formed in the gasket 51, it is possible to allow the flow path 34a to be communicated with the flow path 34b not only through the communication portion 36 but also through the recessed portion 51a. With such a configuration, it is possible to ensure the required effective cross section at a portion where the flow path 34a and the flow path 34b are connected. Thus, it is possible to reduce the size of the fluid control device 100 without disturbing the flow of the fluid.

Especially, in a case in which the angle formed between the flow path 34a and the flow path 34b is 45° or smaller, it is difficult to ensure the required effective cross section only with the communication portion 36. Therefore, the provision of the recessed portion 51a is useful because the required effective cross section can be ensured at the portion where the flow path 34a and the flow path 34b are connected.

Furthermore, in the fluid control device 100, because the recessed portion 51a is formed with the curved surface portion 51b such that the fluid flowing from the flow path 34a is guided so as to be turned to the flow path 34b, it is possible to guide the fluid from the flow path 34a to the flow path 34b smoothly.

The configurations, operations, and effects of the embodiment of the present invention configured as described above will be collectively described.

The flow-path forming block 1 has: the first block (the block 10); the second block (the block 30, 40) attached to the first block (the block 10), the second block (the block 30, 40) having a first flow path (the flow path 34a) and a second flow path (the flow path 34b); and the gasket 51 provided between the first block (the block 10) and the second block (the block 30, 40), the gasket 51 being configured to seal between the first block (the block 10) and the second block (the block 30, 40), wherein the second block (the block 30, 40) has the communication portion 36 formed on the bottom surface 35 facing the gasket 51, the communication portion 36 being configured such that the first flow path (the flow path 34a) and the second flow path (the flow path 34b) are communicated, and the gasket 51 has the recessed portion 51a formed at the position facing the communication portion 36.

In this configuration, because the recessed portion 51a is formed at the position facing the communication portion 36, it is possible to allow the first flow path (the flow path 34a) and the second flow path (the flow path 34b) to be communicated with each other through the recessed portion 51a in addition to the communication portion 36. With such a configuration, it is possible to ensure the effective cross section of the flow path at the portion where the first flow path (the flow path 34a) and the second flow path (the flow path 34b) are connected. Thus, it is possible to reduce the size of the flow-path forming block 1 without disturbing the flow of the fluid.

In addition, in the flow-path forming block 1, the first flow path (the flow path 34a) and the second flow path (the flow path 34b) are formed so as to approach each other towards the recessed portion 51a, and the recessed portion 51a has the curved surface portion 51b configured such that the fluid flowing from the first flow path (the flow path 34a) is guided so as to be turned to the second flow path (the flow path 34b).

In this configuration, even if the angle formed between the first flow path (the flow path 34a) and the second flow path (the flow path 34b) becomes smaller, because the recessed portion 51a has the curved surface portion 51b that is configured such that the fluid flowing from the first flow path (the flow path 34a) is guided so as to be turned to the second flow path (the flow path 34b), it is possible to guide the fluid flowing from the first flow path (the flow path 34a) to the second flow path (the flow path 34b) smoothly by the curved surface portion 51b. With such a configuration, it is possible to further reduce the pressure loss at the portion where the first flow path (the flow path 34a) and the second flow path (the flow path 34b) are connected.

The fluid control device 100 is provided with: the flow-path forming block 1; and a first valve device (the valve device 3, 6) and a second valve device (the valve device 4, 5) attached to the second block (the block 30, 40), wherein the second block (the block 30, 40) further has: a third flow path (the flow path 34c) communicated with and shut off from the first flow path (the flow path 34a) by the first valve device (the valve device 3, 6); and a fourth flow path (the flow path 34d) communicated with and shut off from the second flow path (the flow path 34b) by the second valve device (the valve device 4, 5).

In a case in which the size of the fluid control device 100 is to be reduced, as the distance between the first valve device (the valve device 3, 6) and the second valve device (the valve device 4, 5) is reduced, the distance between the first flow path (the flow path 34a) and the second flow path (the flow path 34b) is also reduced, and as a result, the angle formed between the first flow path (the flow path 34a) and the second flow path (the flow path 34b) becomes smaller even further. As described above, as the angle formed between the first flow path (the flow path 34a) and the second flow path (the flow path 34b) becomes smaller, the pressure loss (the flow path resistance) for the flow flowing from the first flow path (the flow path 34a) to the second flow path (the flow path 34b) is increased. However, in the fluid control device 100, because the recessed portion 51a is formed, it is possible to ensure the effective cross section of the flow path for connecting the first flow path (the flow path 34a) and the second flow path (the flow path 34b). Thus, it is possible to reduce the size of the fluid control device 100 without disturbing the flow of the fluid.

In the fluid control device 100, the first flow path (the flow path 34a) is an outlet flow path of the first valve device (the valve device 3, 6), the second flow path (the flow path 34b) is an inlet flow path of the second valve device (the valve device 4, 5), the third flow path (the flow path 34c) is an inlet flow path of the first valve device (the valve device 3, 6), and the fourth flow path (the flow path 34d) is an outlet flow path of the second valve device (the valve device 4, 5).

In this configuration, because the first valve device (the valve device 3, 6) and the second valve device (the valve device 4, 5) are provided in series in the flow paths 34a to 34d, even in the event of failure of one of the first valve device (the valve device 3, 6) and the second valve device (the valve device 4, 5), it is possible to surely shut off the flow of the fluid flowing through the flow paths 34a to 34d.

The above describes an embodiment of the present invention, however the above embodiment merely illustrates one portion of an application example of the present invention, and does not intend to limit the technical range of the present invention to the specific configurations in the above embodiment.

For example, the valve devices 2, 3, 4, 5, and 6 may be a valve device that is operated by manually operating a driving unit. In addition, the valve devices 2, 3, 4, 5, and 6 may also be a valve device driven by a solenoid. In addition, a description has been given, as an example, of the valve device having the metal diaphragm as the valve body, however, the valve body may be of any type, and for example, the valve body may be a lift valve having a metal bellow, etc.

In addition, in the above-mentioned embodiment, a description has been given of the example in which the flow path 34b is provided as the inlet flow path and the flow path 34d is provided as the outlet flow path, however, the flow path 34d may be provided as the inlet flow path and the flow path 34b may be provided as the outlet flow path.

In the above-mentioned embodiment, a description has been given of the example in which the valve devices 3 and 4 are attached to the block 30, however, the present invention is not limited thereto, and the present invention may be applied to a device to which the other fluid apparatus such as a pressure sensor, a three-way valve, and so forth is attached.

In addition, in the above-mentioned embodiment, a description has been given of the example in which the flow path 34a and the flow path 34b are formed so as to approach each other towards the recessed portion 51a, however, the present invention is not limited thereto, and the flow path 34a and the flow path 34b may extend in parallel.

This application claims priority based on Japanese Patent Application No. 2019-086395 filed with the Japan Patent Office on Apr. 26, 2019, the entire contents of which are incorporated into this specification.

The invention claimed is:

1. A flow-path forming block comprising:
a first block;
a second block attached to the first block, the second block having a first flow path and a second flow path; and
a gasket provided between the first block and the second block, the gasket being configured to seal between the first block and the second block, wherein
the second block has a communication portion formed on a surface facing the gasket, the communication portion being configured such that the first flow path and the second flow path are communicated constantly,
the gasket has a recessed portion formed at a position facing the communication portion, and
a region of the gasket on a bottom side of the recessed portion faces the first block.

2. The flow-path forming block according to claim 1, wherein
the first flow path and the second flow path are formed so as to approach each other towards the recessed portion, and
the recessed portion has a curved surface portion configured such that a fluid flowing from the first flow path is guided so as to be turned to the second flow path.

3. A fluid control device comprising:
the flow-path forming block according to claim 1; and
a first valve device and a second valve device attached to the second block, wherein
the second block further has:
a third flow path communicated with and shut off from the first flow path by the first valve device; and
a fourth flow path communicated with and shut off from the second flow path by the second valve device.

4. The fluid control device according to claim 3, wherein
the first flow path is an outlet flow path of the first valve device,
the second flow path is an inlet flow path of the second valve device,
the third flow path is an inlet flow path of the first valve device, and
the fourth flow path is an outlet flow path of the second valve device.

* * * * *